(12) United States Patent
Van Volkinburg et al.

(10) Patent No.: US 9,418,270 B2
(45) Date of Patent: Aug. 16, 2016

(54) TERMINAL WITH FLICKER-CORRECTED AIMER AND ALTERNATING ILLUMINATION

(75) Inventors: Daniel Van Volkinburg, Syracuse, NY (US); Stephen Patrick Deloge, Palmyra, NY (US); Kevin Bower, Syracuse, NY (US); Matthew Pankow, Camillus, NY (US); Ryan Kather, Cicero, NY (US)

(73) Assignee: Hand Held Products, Inc., Fort Mill, SC (US)

(*) Notice: Subject to any disclaimer, the term of this patent is extended or adjusted under 35 U.S.C. 154(b) by 0 days.

(21) Appl. No.: 13/017,926

(22) Filed: Jan. 31, 2011

(65) Prior Publication Data

US 2012/0193429 A1     Aug. 2, 2012

(51) Int. Cl.
*G06K 7/10* (2006.01)
*G06K 19/06* (2006.01)

(52) U.S. Cl.
CPC .......... *G06K 7/1095* (2013.01); *G06K 7/10732* (2013.01); *G06K 7/10752* (2013.01); *G06K 7/10811* (2013.01); *G06K 7/10881* (2013.01); *G06K 2019/06225* (2013.01); *G06K 2207/1011* (2013.01)

(58) Field of Classification Search
CPC .. G06K 7/10871; G06K 7/14; G06K 7/10811
USPC ........................................................ 235/470
See application file for complete search history.

(56) References Cited

U.S. PATENT DOCUMENTS

| | | |
|---|---|---|
| 5,019,699 A | 5/1991 | Koenck |
| 5,406,062 A | 4/1995 | Hasegawa et al. |
| 5,504,367 A | 4/1996 | Arackellian et al. |
| 5,536,930 A * | 7/1996 | Barkan et al. ............ 235/472.01 |
| 5,541,419 A | 7/1996 | Arackellian |
| 5,572,006 A | 11/1996 | Wang et al. |

(Continued)

FOREIGN PATENT DOCUMENTS

| | | |
|---|---|---|
| EP | 1615420 A | 1/2006 |
| JP | 01276283 | 11/1989 |

(Continued)

OTHER PUBLICATIONS

U.S. Appl. No. 13/174,333, filed Jun. 30, 2011.

(Continued)

*Primary Examiner* — Rafferty Kelly
(74) *Attorney, Agent, or Firm* — Additon, Higgins & Pendleton, P.A.

(57) ABSTRACT

An indicia reading terminal is disclosed that eliminates unwanted flickering effects in an illuminated screen reading mode, among other advantageous features. The indicia reading terminal, in response to a screen reading signal, is operative to activate a screen reading cycle. In the screen reading cycle, an imaging subsystem is activated at least once at the same time that an illumination subsystem is activated for one of a plurality of active illumination periods, for a first illuminated exposure period. The imaging subsystem is activated at least once while the illumination subsystem is not activated, for a first unilluminated exposure period, which is longer than the first illuminated exposure period. An aimer subsystem is activated for a plurality of active aimer periods when neither the imaging subsystem or the illumination subsystem is activated, wherein intervals of time between the active aimer periods are equal, within nominal tolerances.

32 Claims, 5 Drawing Sheets

(56) References Cited

U.S. PATENT DOCUMENTS

| | | | |
|---|---|---|---|
| 5,576,529 | A | 11/1996 | Koenck et al. |
| 5,591,955 | A | 1/1997 | Laser |
| 5,646,390 | A | 7/1997 | Wang et al. |
| 5,648,650 | A | 7/1997 | Sugifune et al. |
| 5,701,001 | A | 12/1997 | Sugifune et al. |
| 5,756,981 | A * | 5/1998 | Roustaei et al. ......... 235/462.42 |
| 5,784,102 | A | 7/1998 | Hussey et al. |
| 5,815,200 | A | 9/1998 | Ju et al. |
| 5,877,487 | A | 3/1999 | Tani et al. |
| 5,886,338 | A | 3/1999 | Arackellian et al. |
| 6,010,070 | A | 1/2000 | Mizuochi et al. |
| 6,230,975 | B1 | 5/2001 | Colley et al. |
| 6,254,003 | B1 | 7/2001 | Pettinelli et al. |
| 6,283,374 | B1 | 9/2001 | Fantone et al. |
| 6,347,163 | B2 | 2/2002 | Roustaei |
| 6,412,700 | B1 | 7/2002 | Blake et al. |
| 6,474,816 | B2 | 11/2002 | Butler et al. |
| 6,669,093 | B1 * | 12/2003 | Meyerson et al. ....... 235/472.01 |
| 6,695,209 | B1 | 2/2004 | La |
| 6,749,120 | B2 | 6/2004 | Hung et al. |
| 6,832,725 | B2 | 12/2004 | Gardiner et al. |
| 6,877,661 | B2 | 4/2005 | Webb et al. |
| 6,999,118 | B2 | 2/2006 | Suzuki |
| 7,021,534 | B1 | 4/2006 | Kiliccote |
| 7,054,660 | B2 | 5/2006 | Lord |
| 7,061,395 | B1 | 6/2006 | Bromer |
| 7,069,001 | B2 | 6/2006 | Rupp et al. |
| 7,072,854 | B2 | 7/2006 | Loeser |
| 7,077,321 | B2 | 7/2006 | Longacre, Jr. et al. |
| 7,083,097 | B2 | 8/2006 | Toyama et al. |
| 7,083,098 | B2 | 8/2006 | Joseph et al. |
| 7,106,368 | B2 | 9/2006 | Daiku et al. |
| 7,142,234 | B2 | 11/2006 | Kaplinsky et al. |
| 7,185,817 | B2 | 3/2007 | Zhu et al. |
| 7,186,000 | B2 | 3/2007 | Lebens et al. |
| 7,203,158 | B2 | 4/2007 | Oshima et al. |
| 7,204,418 | B2 | 4/2007 | Joseph et al. |
| 7,219,843 | B2 | 5/2007 | Havens et al. |
| 7,234,641 | B2 | 6/2007 | Olmstead |
| 7,240,844 | B2 | 7/2007 | Zhu et al. |
| 7,248,160 | B2 | 7/2007 | Mangan et al. |
| 7,255,279 | B2 | 8/2007 | Zhu et al. |
| 7,270,274 | B2 | 9/2007 | Hennick et al. |
| 7,303,126 | B2 | 12/2007 | Patel et al. |
| 7,308,375 | B2 | 12/2007 | Jensen et al. |
| 7,320,431 | B2 | 1/2008 | Zhu et al. |
| 7,336,197 | B2 | 2/2008 | Ding et al. |
| 7,357,326 | B2 | 4/2008 | Hattersley et al. |
| 7,358,955 | B2 | 4/2008 | Lim |
| 7,387,250 | B2 | 6/2008 | Mani |
| 7,398,927 | B2 | 7/2008 | Olmstead et al. |
| 7,490,778 | B2 | 2/2009 | Zhu et al. |
| 7,499,090 | B2 | 3/2009 | Olmstead et al. |
| 7,503,499 | B2 | 3/2009 | Zhu et al. |
| 7,513,430 | B2 | 4/2009 | Zhu et al. |
| 7,516,899 | B2 | 4/2009 | Laser |
| 7,527,207 | B2 | 5/2009 | Acosta et al. |
| 7,533,824 | B2 | 5/2009 | Hennick et al. |
| 7,552,867 | B2 | 6/2009 | Waltman |
| 7,557,833 | B2 | 7/2009 | Okawa |
| 7,568,628 | B2 | 8/2009 | Wang et al. |
| 7,577,462 | B2 | 8/2009 | Kumar |
| 7,611,060 | B2 | 11/2009 | Wang et al. |
| 7,656,436 | B2 | 2/2010 | Kinoshita et al. |
| 7,656,556 | B2 | 2/2010 | Wang |
| 7,693,744 | B2 | 4/2010 | Forbes |
| 7,699,227 | B2 | 4/2010 | Wang et al. |
| 7,705,893 | B2 | 4/2010 | Kinoshita |
| 7,735,737 | B2 | 6/2010 | Kotlarsky et al. |
| 7,739,190 | B2 | 6/2010 | Shin et al. |
| 7,740,168 | B2 | 6/2010 | Hammad et al. |
| 7,750,949 | B2 | 7/2010 | Poplin et al. |
| 7,762,464 | B2 | 7/2010 | Goren et al. |
| 7,770,799 | B2 | 8/2010 | Wang |
| 7,775,436 | B2 | 8/2010 | Knowles |
| 7,780,089 | B2 | 8/2010 | Wang |
| 7,809,407 | B2 | 10/2010 | Oshima et al. |
| 7,810,720 | B2 | 10/2010 | Lovett |
| 7,813,047 | B2 | 10/2010 | Wang et al. |
| 7,822,688 | B2 | 10/2010 | Labrou et al. |
| 7,909,257 | B2 | 3/2011 | Wang et al. |
| 7,918,398 | B2 | 4/2011 | Li et al. |
| 7,920,175 | B2 | 4/2011 | Kawarada |
| 7,944,438 | B2 | 5/2011 | Bone et al. |
| 7,995,097 | B2 | 8/2011 | Tzur et al. |
| 7,995,178 | B2 | 8/2011 | Suguro et al. |
| 8,040,392 | B2 | 10/2011 | Ono et al. |
| 8,040,393 | B2 | 10/2011 | Katoh et al. |
| 8,045,016 | B2 | 10/2011 | Nishiwaki et al. |
| 8,068,148 | B2 | 11/2011 | Noyes et al. |
| 8,074,887 | B2 | 12/2011 | Havens et al. |
| 8,106,963 | B2 | 1/2012 | Tsukihara |
| 8,115,828 | B2 | 2/2012 | Mikami |
| 8,134,621 | B2 | 3/2012 | Olmstead et al. |
| 8,169,595 | B2 | 5/2012 | Schriever et al. |
| 2002/0126780 | A1 | 9/2002 | Oshima et al. |
| 2003/0062413 | A1 | 4/2003 | Gardiner et al. |
| 2003/0222147 | A1 | 12/2003 | Havens et al. |
| 2004/0020990 | A1 | 2/2004 | Havens et al. |
| 2004/0164165 | A1 | 8/2004 | Havens et al. |
| 2005/0001035 | A1 | 1/2005 | Hawley et al. |
| 2005/0023356 | A1 | 2/2005 | Wiklof et al. |
| 2005/0103854 | A1 | 5/2005 | Zhu et al. |
| 2005/0279836 | A1 | 12/2005 | Havens et al. |
| 2006/0011724 | A1 | 1/2006 | Joseph et al. |
| 2006/0043194 | A1 | 3/2006 | Barkan et al. |
| 2006/0113386 | A1 | 6/2006 | Olmstead |
| 2006/0163355 | A1 | 7/2006 | Olmstead et al. |
| 2006/0202036 | A1 | 9/2006 | Wang et al. |
| 2007/0138293 | A1 | 6/2007 | Zhu et al. |
| 2007/0181692 | A1 | 8/2007 | Barkan et al. |
| 2007/0284447 | A1 | 12/2007 | McQueen |
| 2008/0023556 | A1 | 1/2008 | Vinogradov et al. |
| 2008/0223933 | A1 | 9/2008 | Smith |
| 2009/0026267 | A1 | 1/2009 | Wang et al. |
| 2009/0057413 | A1 | 3/2009 | Vinogradov et al. |
| 2009/0072038 | A1 | 3/2009 | Li et al. |
| 2009/0088203 | A1 | 4/2009 | Havens et al. |
| 2009/0140050 | A1 | 6/2009 | Liu et al. |
| 2009/0182634 | A1 | 7/2009 | Park et al. |
| 2009/0240598 | A1 | 9/2009 | Kargman |
| 2010/0044436 | A1 | 2/2010 | Powell et al. |
| 2010/0044440 | A1 | 2/2010 | Wang et al. |
| 2010/0078477 | A1 | 4/2010 | Wang et al. |
| 2010/0108769 | A1 | 5/2010 | Wang et al. |
| 2010/0147956 | A1 | 6/2010 | Wang et al. |
| 2010/0157086 | A1 | 6/2010 | Segale et al. |
| 2010/0219234 | A1 | 9/2010 | Forbes |
| 2011/0163165 | A1 | 7/2011 | Liu et al. |
| 2011/0174880 | A1 | 7/2011 | Li et al. |
| 2012/0000982 | A1 | 1/2012 | Gao et al. |
| 2012/0111944 | A1 | 5/2012 | Gao et al. |
| 2012/0138684 | A1 | 6/2012 | Van Volkinburg et al. |
| 2012/0153022 | A1 | 6/2012 | Havens et al. |
| 2012/0193429 | A1 | 8/2012 | Van Volkinburg et al. |

FOREIGN PATENT DOCUMENTS

| | | |
|---|---|---|
| JP | 04178788 | 6/1992 |
| JP | 2001184452 A | 7/2001 |
| JP | 2003228688 A | 8/2003 |
| JP | 200430014 A | 1/2004 |
| JP | 2007287009 A | 11/2007 |
| JP | 2008527492 | 7/2008 |
| JP | 2009129266 A | 6/2009 |
| WO | WO2004/093433 A1 | 4/2003 |
| WO | WO2006073660 A2 | 7/2008 |
| WO | 2010147609 A1 | 12/2010 |

OTHER PUBLICATIONS

U.S. Appl. No. 13/309,195, filed Dec. 1, 2011.
U.S. Appl. No. 13/170,104, filed Jun. 27, 2011.
U.S. Appl. No. 13/324,197, filed Dec. 13, 2011.

(56) References Cited

OTHER PUBLICATIONS

U.S. Appl. No. 13/428,500, filed Mar. 23, 2012.
Search Report issued Oct. 25, 2013, in corresponding European application No. 12153181.8; 5 pages.
Japanese Office Action in related Application No. 2012-016893, Translation provided, Dated Oct. 30, 2015, pp. 10.
Japanese Final Decision of Rejection in related JP Application No. 2012-016893, Dated Apr. 27, 2016, 8 pages (English Machine Translation provided).

* cited by examiner

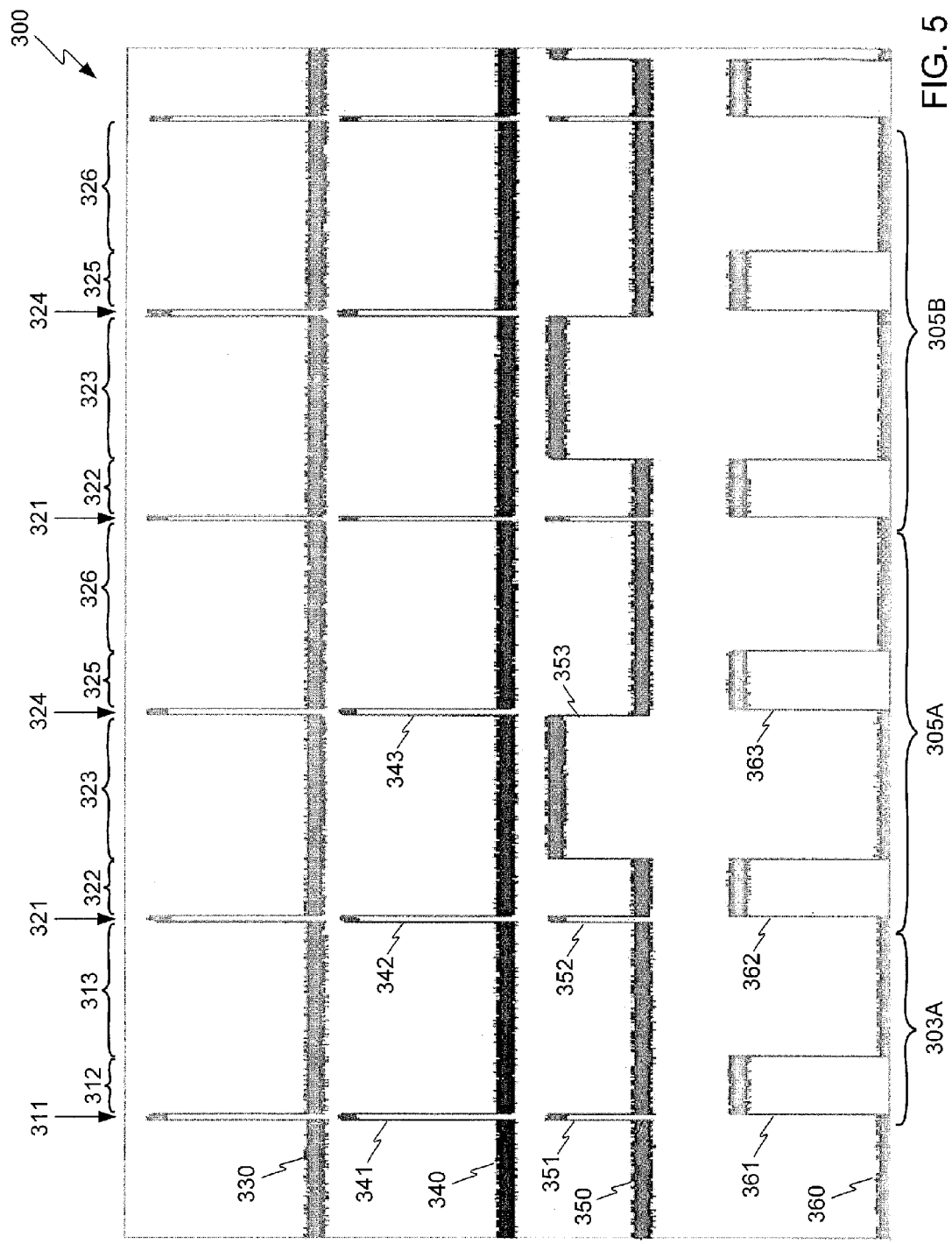

TERMINAL WITH FLICKER-CORRECTED AIMER AND ALTERNATING ILLUMINATION

FIELD OF THE INVENTION

The present invention relates in general to optical based registers, and particularly is related to an image sensor based indicia reading terminal.

BACKGROUND

Indicia reading terminals for reading decodable indicia are available in multiple varieties. For example, minimally featured indicia reading terminals devoid of a keyboard and display are common in point of sale applications. Indicia reading terminals devoid of a keyboard and display are available in the recognizable gun style form factor having a handle and trigger button (trigger) that can be actuated by an index finger. Indicia reading terminals having keyboards and displays are also available. Keyboard and display equipped indicia reading terminals are commonly used in shipping and warehouse applications, and are available in form factors incorporating a display and keyboard. In a keyboard and display equipped indicia reading terminal, a trigger button for actuating the output of decoded messages is typically provided in such locations as to enable actuation by a thumb of an operator. Indicia reading terminals in a form devoid of a keyboard and display or in a keyboard and display equipped form are commonly used in a variety of data collection applications including point of sale applications, shipping applications, warehousing applications, security check point applications, and patient care applications. Some indicia reading terminals are adapted to read bar code symbols including one or more of one dimensional (1D) bar codes, stacked 1D bar codes, and two dimensional (2D) bar codes. Other indicia reading terminals are adapted to use optical character recognition (OCR) to read standard characters while still other indicia reading terminals are equipped to read both bar code symbols and OCR characters. Recently, a mobile phone read mode was developed for scanners to read bar codes from mobile phones or other LED displays. This mode has an illumination toggling feature in which one image is taken with illumination on, and the next image is taken without illumination.

The discussion above is merely provided for general background information and is not intended to be used as an aid in determining the scope of the claimed subject matter.

SUMMARY

An indicia reading terminal and associated method are disclosed that provide improved indicia reading on device screens, that provide flicker correction in both illumination and aimer subsystems, to reduce or eliminate unwanted flickering effects in a screen reading mode, among other advantageous features. Typical illuminated screen reading modes, for scanners to read bar codes from device screens such as on mobile phones or other LED screens or displays, rely on alternating exposures with and without illumination, with some exposures unilluminated to avoid specular reflection from the device screen to be read. The unilluminated exposure times are required to be significantly longer, and the illuminated exposures and aimer activations were timed around the long unilluminated exposure times, which resulted in significant flickering effects in both the illumination and the aimer. These flickering effects involve a noticeable change in illumination brightness, and tend to be distracting and uncomfortable.

These flickering effects in both the illumination and aimer subsystems are reduced or eliminated by a terminal of various embodiments as provided herein. In an illustrative embodiment, a terminal includes an illumination subsystem operative for projecting of an illumination pattern, an aimer subsystem operative for projecting an aiming pattern, an imaging subsystem, a housing, a memory, and a processor, in a variety of embodiments. The housing encapsulates the illumination subsystem, the aimer subsystem, and the imaging subsystem. The imaging subsystem includes an image sensor array and an imaging optics assembly operative for focusing an image onto the image sensor array. The memory is capable of storing frames of image data representing light incident on the image sensor array. The processor is operative for addressing said memory, and to attempt to decode a decodable indicia represented in at least one of the frames of image data. The indicia reading terminal, in response to a screen reading signal, is operative to activate a screen reading cycle. In the screen reading cycle, the imaging subsystem is activated at least once at the same time that the illumination subsystem is activated for one of a plurality of active illumination periods, for a first illuminated exposure period. The imaging subsystem is activated at least once while the illumination subsystem is not activated, for a first unilluminated exposure period, which is longer than the first illuminated exposure period. The aimer subsystem is activated for a plurality of active aimer periods when neither the imaging subsystem or the illumination subsystem is activated, wherein intervals of time between the active aimer periods are equal, within nominal tolerances.

In another illustrative embodiment, a method includes activating an imaging subsystem at least once at the same time that an illumination subsystem is activated for one of a plurality of active illumination periods, for a first illuminated exposure period. The method also includes activating the imaging subsystem at least once while the illumination subsystem is not activated, for a first unilluminated exposure period, which is longer than the first illuminated exposure period. The method further includes activating an aimer subsystem for a plurality of active aimer periods when neither the imaging subsystem or the illumination subsystem is activated, wherein intervals of time between the active aimer periods are equal, within nominal tolerances. The method also includes performing an attempted decode of a decodable indicia by a processor utilizing one or more frames of image data from at least one of the first illuminated exposure period and the first unilluminated exposure period.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

The features described herein can be better understood with reference to the drawings described below. The drawings are not necessarily to scale, emphasis instead generally being placed upon illustrating the principles of various illustrative embodiments. In the drawings, like numerals are used to indicate like parts throughout the various views.

FIG. 5 depicts a timing diagram illustrating associations between active illumination periods, exposure periods, and active aimer periods, in accordance with an illustrative embodiment.

DETAILED DESCRIPTION OF ILLUSTRATIVE EMBODIMENTS

Figure 1:
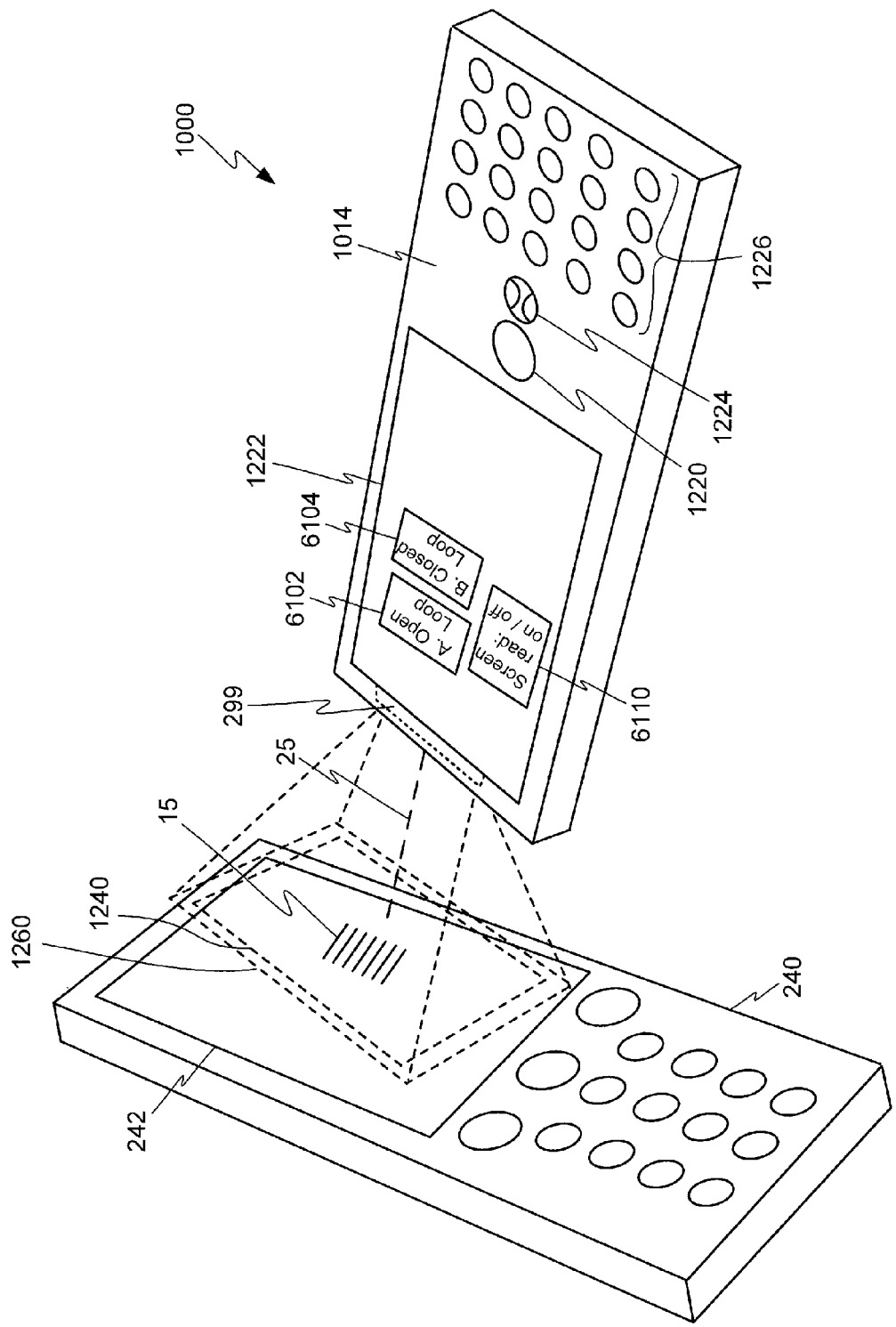
FIG. 1 depicts a perspective view of an indicia reading terminal, having a plurality of operator selectable configurations, and reading an indicia on a screen of a digital device, in accordance with an illustrative embodiment.
Figure 2:
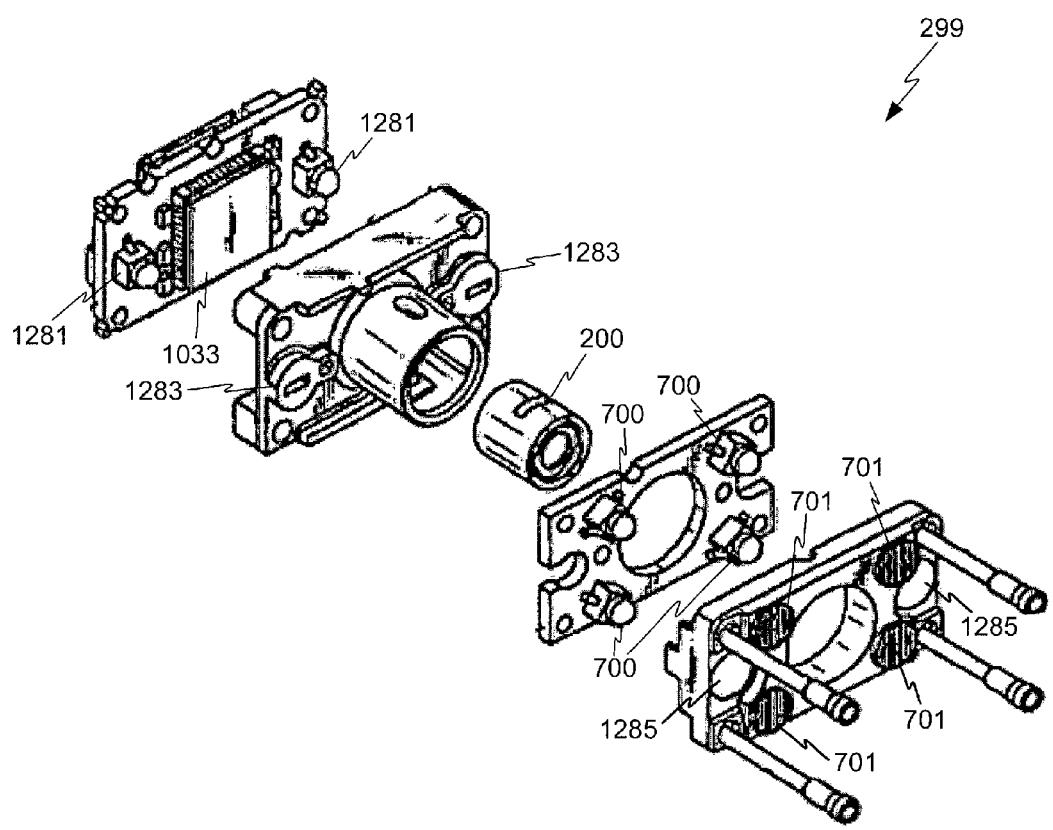
FIG. 2 depicts an exploded perspective view of an imaging module of an indicia reading terminal, in accordance with an illustrative embodiment.
Figure 3:
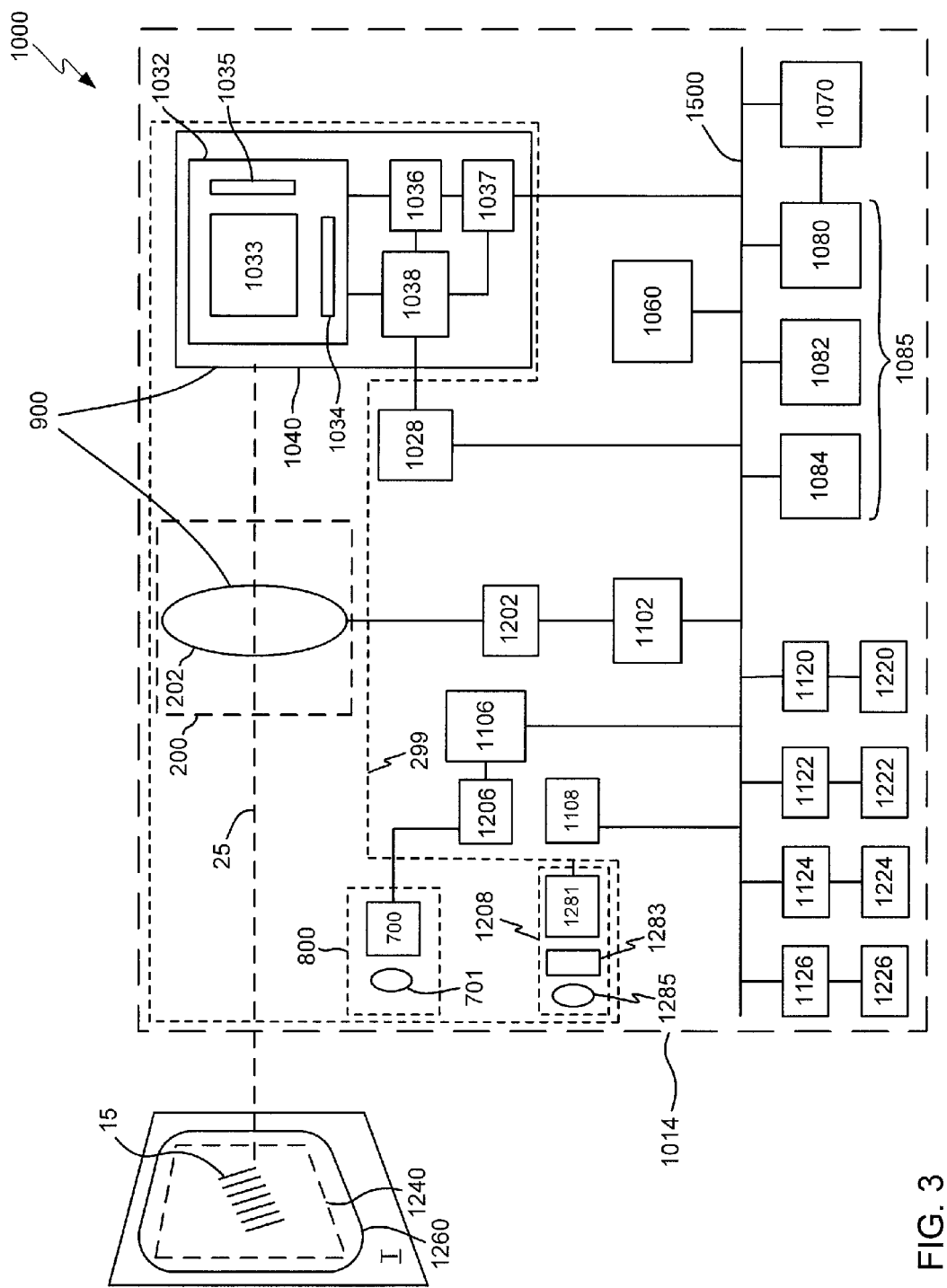
FIG. 3 depicts a block diagram of an indicia reading terminal, in accordance with an illustrative embodiment.

FIG. 1 depicts a perspective view of indicia reading terminal 1000, having a plurality of operator selectable configurations, and depicted reading an indicia 15 on a screen 242 of a digital device 240, in accordance with an illustrative embodiment. FIG. 2 depicts an exploded perspective view of imaging module 299 of an indicia reading terminal 1000, in accordance with an illustrative embodiment that corresponds with indicia reading terminal 1000 as shown in FIG. 1. FIG. 3 depicts a block diagram of indicia reading terminal 1000, in accordance with an illustrative embodiment that corresponds with indicia reading terminal 1000 as shown in FIG. 1 and imaging module 299 as shown in FIG. 2. Referring to FIGS. 1 through 3, with various indicated features depicted in one or more of these figures, there is set forth herein a novel indicia reading terminal 1000 having an imaging module 299, a hand held housing 1014, a memory 1085, and a processor 1060, where imaging module 299 includes an imaging illumination subsystem 800, an imaging subsystem 900, and an aimer subsystem 1208.

Imaging illumination subsystem 800 may be operative for projecting an illumination pattern. Imaging subsystem 900 may include an image sensor array 1033 and an imaging optics assembly 200 operative for focusing an image onto the image sensor array 1033. Hand held housing 1014 encapsulates imaging illumination subsystem 800 and imaging subsystem 900, in this illustrative embodiment. Memory 1085 is capable of storing one or more frames of image data, in which the frames of image data may represent light incident on image sensor array 1033. Processor 1060 is operative for addressing memory 1085 and processing the frames of image data, such as processing for attempting to decode decodable indicias represented in the image data.

Indicia reading terminal 1000 is operative to activate a flicker-corrected screen reading mode, especially adapted for reading an indicia on a monitor, display, or any other type of screen of a device, such as screen 242 on digital device 240. When operating in the screen reading mode, indicia reading terminal 1000 may activate separate exposure periods, including illuminated exposure periods and unilluminated exposure periods.

Illuminated exposure periods and unilluminated exposure periods may be activated in any order in a screen reading cycle. For example, the first exposure in a cycle may be an illuminated exposure and the second exposure in the cycle may be an unilluminated exposure, or the first exposure in a cycle may be an unilluminated exposure and the second exposure in the cycle may be an illuminated exposure, in various illustrative embodiments. For example, imaging illumination subsystem 800 may project the illumination pattern while imaging subsystem 900 exposes a first frame of image data during an illuminated exposure period. Shortly thereafter, imaging illumination subsystem 800 may refrain from projecting the illumination pattern while imaging subsystem 900 exposes a second frame of image data during an unilluminated exposure period. Processor 1060 is operative to attempt to decode a decodable indicia, such as indicia 15, from at least one of the frames of image data, or subsequent frames of image data from illuminated exposures and/or unilluminated exposures. Processor 1060 may be able to successfully decode an image depending on a variety of factors involving the specifics of the terminal and of the screen, in various illustrative embodiments. Some components of indicia reading terminal 1000 as depicted on FIGS. 1 and 2 are described in subsequent sections below. For example, terminal 1000 further includes various user-selectable buttons 6102 and 6104 corresponding to various operating configurations. These are further explained below.

Indicia reading terminal 1000 operating in the screen reading mode may therefore perform both illuminated exposures and unilluminated exposures, in an illustrative embodiment. Unilluminated exposures may sometimes offer advantageous performance in reading an indicia on a screen. By performing both illuminated and unilluminated exposures, and illustratively alternating between the two, terminal 1000 may improve or optimize its performance in reading the screen-based indicia, where either illuminated or unilluminated exposures might offer the best conditions for imaging and decoding the indicia, in various illustrative embodiments. The screen reading mode may also use other features that in various embodiments may be advantageous in combination with alternating illuminated and unilluminated exposures, such as a flicker correction feature, which is described further below. In this usage, "unilluminated exposures" refer to exposures when the imaging system exposes a frame of image data while the illumination system remains inactive and refrains from projecting illumination on the target of the exposure. An "unilluminated exposure" refers to a lack of active illumination from the terminal itself, either from the imaging illumination or from the aimer illumination, though the target may still be illuminated by other light sources such as ambient light or by the target's own illumination, such as with a monitor or other type of screen on another digital device, for example.

Unilluminated exposures may offer an advantage in reading indicias rendered on device screens. A wide variety of screens and screen technologies are used in connection with various devices, and may include any type of display, monitor, or other type of graphical or visual output device. Screens may illustratively involve liquid crystal display (LCD), electronic ink or electronic paper, plasma, cathode ray tubes (CRT), and/or other graphical output mechanisms.

Various screen technologies have a wide variety of optical properties and may differ widely in reflectivity or other attributes that optically interfere with successfully imaging a screen under various forms of illumination, depending on factors such as the underlying technology, the number and types of layers involved in or over the screen, whether the screen is color or black and white, or whether the screen is enabled for touch input, for example. Many types of screens may cause substantial specular reflection of an external illumination source, for example. By having imaging illumination subsystem 800 refraining from projecting the illumination pattern in an exposure period during which imaging subsystem 900 exposes a frame of image data, imaging subsystem 900 may image the target indicia without optical interference effects from the screen such as specular reflection, which may enable superior capability for the terminal 1000 to image and decode the indicia, in various illustrative embodiments.

Figure 4:
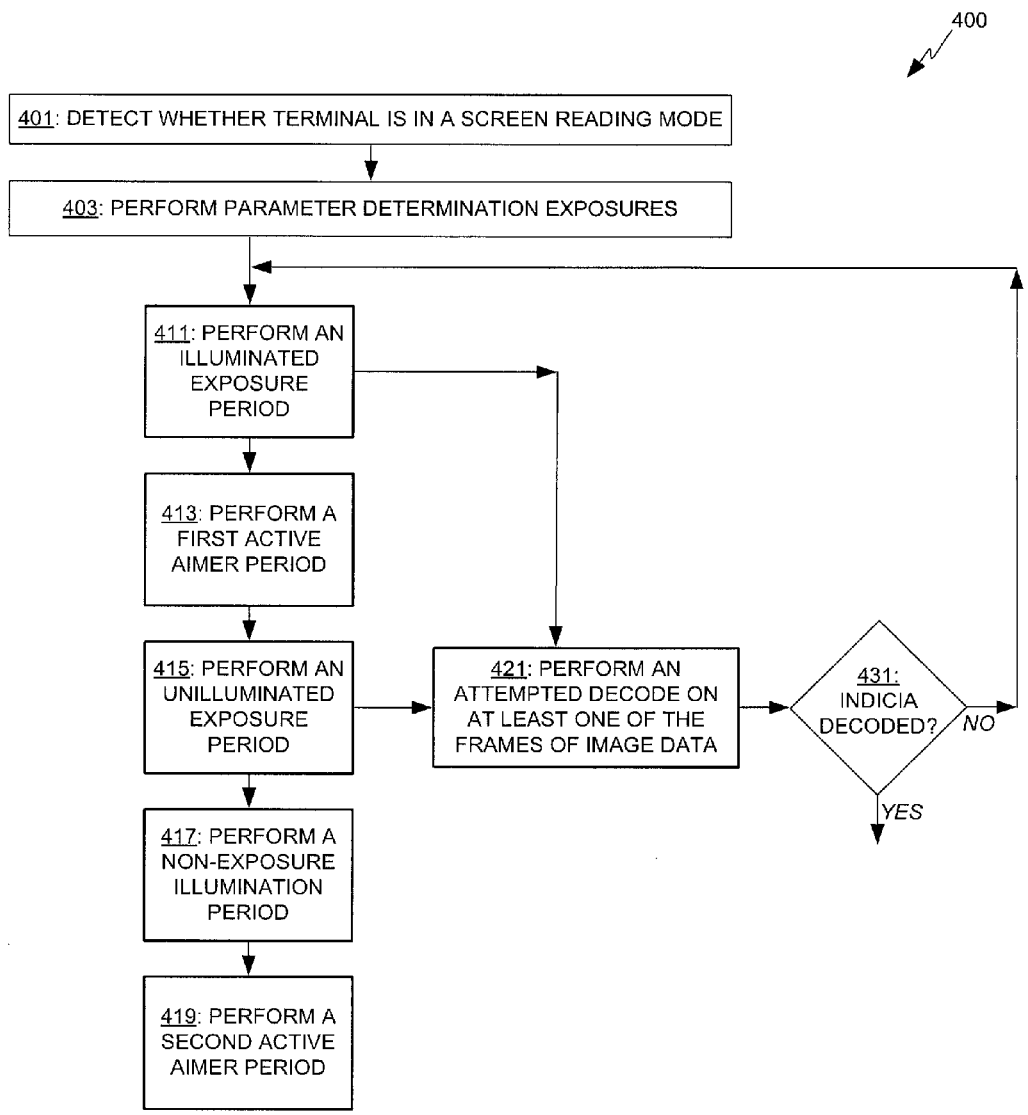
FIG. 4 depicts a flowchart for a method, in accordance with an illustrative embodiment.

FIG. 4 depicts a flowchart of a method 400 for using an indicia reading terminal that has a screen reading mode, in accordance with an illustrative example. Various embodiments of method 400 may illustratively be used in various modes of operation with indicia reading terminal 1000 of FIGS. 1 through 3, for example.

FIG. 5 depicts a timing diagram illustrating associations between active illumination periods, exposure periods, and active aimer periods, which correspond to the illustrative method example depicted in the flowchart of FIG. 4. FIG. 5 is introduced briefly before the steps of the method 400 of FIG. 4 are discussed. FIG. 5 depicts an initial standard cycle 303A, followed by representative screen reading cycles 305A, 305B according to an illustrative embodiment. Timing diagram 300 shows voltage levels applied to different components of an imaging module 299 of a terminal 1000, in an illustrative embodiment, in each case showing a baseline which may be zero volts, for example, and elevated levels, which may generally be in a range of around one-half to two volts, in an illustrative embodiment.

Making reference also to components as seen in FIGS. 2 and 3, these voltage levels are applied for an LED level signal 330, an imaging illumination signal 340 provided to an imaging illumination light source assembly 700 (as seem in FIGS. 2 and 3), exposure control signal 350 provided for making exposures with an imaging subsystem 900, and aimer signal 360 provided for an aimer subsystem 1208. Elevated levels of voltage as shown on the timing diagram indicate activation of the given component, such as for representative imaging illumination activation signal 341 with the imaging illumination 340, for representative exposure activation signal 351 with the exposure control 350, and for representative aimer activation signal 361 with the aimer control 360. Thus, the initial standard cycle 303A includes an illuminated exposure period 311, which includes imaging illumination activation signal 341 at the same time as an exposure activation signal 351; followed by an active aimer period 312, which includes an aimer activation signal 361; followed in turn by an interim period 313, in which none of the imaging illumination, the imaging exposure, or the aimer are active. This initial standard cycle 303A may be compared to the screen reading cycles 305A, 305B, as described below.

How the illumination states and exposure states operate for a given representative sample of consecutive periods in a screen reading cycle, labeled 321 through 326 to correspond to those periods indicated in FIG. 5, are demonstrated on Table A as follows:

illustrative embodiment, while variations in the steps and in their details may be used in other embodiments.

Method 400 may include preliminary steps 401, of detecting whether a terminal is in a screen reading mode, and step 403, of performing parameter determination exposures. For step 401, of detecting whether a terminal is in a screen reading mode, a terminal may be made to enter a screen reading mode by any of a variety of triggers. For example, a user may also use terminal 1000 to scan a programming indicia that, when scanned and decoded by terminal 1000, instructs the terminal 1000 to enter the screen reading mode. As another example, a user may enter a manual input such as using button 6110 on the screen 1222 of terminal 1000 to set terminal 1000 in a screen reading mode. A user activating a manual trigger on the terminal 1000 may activate a trigger signal, for example. The trigger may be a physical component, such as trigger 1220 of terminal 1000, that may be physically depressed, pulled, or touched, for example, or it may be a widget on a touch screen, such as display 1222 of terminal 1000, that is touched, or any other form of user input in various embodiments. The terminal may then perform one or more screen reading cycles on an open loop basis while the trigger activation signal is on or activated, and may end when the trigger signal stops or is no longer active, such as due to a release of a trigger, an expiration of a timeout period, or a successful decode, for example. While these illustrative examples involve manual trigger modes, various embodiments may also use automatic trigger modes.

For example, the terminal 1000 may also be configured so that when the terminal 1000 enters the screen reading mode when it detects a device screen in a target area of the imaging subsystem 900. This may involve a separate dedicated sensor, or aspects of existing features of the terminal that adapt it for sensing an operating screen in an imaging target area. For example, visual cues of an operating screen may be imaged through the imaging subsystem, and encoded in data sent to the processor, and the processor may be programmed to recognize the visual cues of the operating screen in the imaging data. Such visual cues of an operating screen may illustratively include aspects such as light frequencies, power spectra, shape of a light source, or other indicative characteristics, in different embodiments. The processor may be programmed to then automatically activate the screen reading mode in response to the screen being thus detected. The manual input, the scanned instruction indicia input, and the detection of a device screen in the target area are therefore all varieties of triggers for activating a screen reading signal in terminal 1000, in response to which, the terminal 1000 is operative to activate a screen reading cycle.

Step 403, of performing parameter determination exposures, may involve one or several exposures. These may be

TABLE A

| Configuration | 321 | 322 | 323 | 324 | 325 | 326 |
|---|---|---|---|---|---|---|
| 305A, 305B, . . . | Illumination: on<br>Exposure: on<br>Aimer: off | Illumination: off<br>Exposure: off<br>Aimer: on | Illumination: off<br>Exposure: on<br>Aimer: off | Illumination: on<br>Exposure: off<br>Aimer: off | Illumination: off<br>Exposure: off<br>Aimer: on | Illumination: off . . .<br>Exposure: off<br>Aimer: off |

The flowchart for method 400 indicates an illustrative selection and ordering of steps in a method of one implementation, while other method implementations may include only some of these steps, and/or additional steps not depicted in FIG. 4, and may have differences in the ordering or processes for performing the different steps. The steps of method 400 are described in more detail as follows in accordance with one illuminated or unilluminated exposures, and may be used for determining operating parameters of subsequent exposures for actually acquiring frames of image data for attempted decoding. These parameter determination exposures may be exposed and processed to determine parameters such as target distance and ambient light that are used in determining parameters such as focus and illumination duration for subsequent exposures for attempted indicia decoding. Step 403 of performing parameter determination exposures may also overlap with other preliminary steps, potentially such as by imaging and determining the presence of an operating screen of a digital device in the target area and in response, activating a screen reading mode, for example.

Step 411 involves performing an illuminated exposure period of an indicia reading terminal. In step 411, the imaging illumination subsystem 800 of the terminal 1000 projects an illumination pattern at the same time that an imaging subsystem 900 of the terminal 1000 exposes a frame of image data onto an image sensor array 1033, for an illuminated exposure period. This corresponds to illuminated exposure period 321 of screen reading cycle 305A as seen in FIG. 5, which includes imaging illumination activation signal 342 at the same time as an exposure activation signal 352.

Step 412 involves performing a first active aimer period of an indicia reading terminal. In step 412, the aimer subsystem 1208 of the terminal 1000 projects an aimer illumination pattern, for an active aimer period. This corresponds to first active aimer period 322 of screen reading cycle 305A, which includes aimer activation signal 362.

Step 413 involves performing an unilluminated exposure period of an indicia reading terminal. In step 413, the imaging subsystem 900 of the terminal 1000 exposes a frame of image data onto an image sensor array 1033 while the imaging illumination subsystem 800 of the terminal 1000 is not projecting an illumination pattern, for an unilluminated exposure period. The aimer subsystem 1208 also does not project illumination during this time. This corresponds to unilluminated exposure period 323 of screen reading cycle 305A as seen in FIG. 5, which includes exposure activation signal 353. The frame of image data from the previous, illuminated exposure activated by exposure activation signal 352 is downloaded from image sensor array 1033 to a data storage buffer or processor for processing prior to exposure activation signal 353, so that image sensor array 1033 is ready to acquire the new frame of image data during the unilluminated exposure period 323. The frame of image data from unilluminated exposure period 323 is likewise downloaded from image sensor array 1033 to a data storage buffer or processor for processing prior to a subsequent exposure. Multiple frames of image data may be buffered at the same time, in one or more data storage buffering components, and multiple frames of image data may be processed at the same time, by one or more processors.

In various illustrative embodiments it may be advantageous to use a longer exposure time during unilluminated exposures, including a longer duration of time for unilluminated exposure period 323 than for illuminated exposure period 321 of screen reading cycle 305A. For example, when reading a screen on a device, the screen may provide its own illumination, but may typically have lower intensity than the typical illumination provided by the indicia reading terminal's own illumination subsystem, in various illustrative embodiments. In this case, a longer exposure time may facilitate imaging the target indicia with good performance, as illustratively measured in terms of resolution or signal to noise ratio, for example.

In another illustrative embodiment, the screen of a device may not use its own illumination, such as an electronic ink or electronic paper screen, for example, and the second exposure period may use ambient light for illuminating the target indicia on the screen, in this embodiment. A very wide range of ambient light conditions may exist, at least some of which are likely to provide significantly less illumination to the target indicia than is provided by the terminal's illumination subsystem. In this example also, a longer duration of time for the unilluminated exposure period 323 may be advantageous in imaging the target with sufficient resolution or signal strength.

This longer period of exposure for the unilluminated exposure may vary widely in different embodiments, depending on factors such as the specifics of the imaging optics assembly and the image sensor array of a given embodiment of an indicia reading terminal. Some illustrative specifics relevant to the duration of time required to acquire sufficient image resolution may include the size of the objective lens of the optics, the transmission coefficient of any refractive optical elements and the reflection coefficient of any reflective optical elements, the type of image sensor array, the presence and type of any filters in the optical path or on the image sensor array, the number of pixels and the area per pixel on the image sensor array, the quantum efficiency of the pixels on the image sensor array, and any features that improve the effective quantum efficiency of the pixels on the image sensor array such as microlenses, for example. Factors such as these may be taken into account in determining appropriate durations of time for any particular embodiment for the imaging subsystem to expose an unilluminated frame of image data for an unilluminated exposure period 323.

Step 414 involves performing a non-exposure illumination period of an indicia reading terminal. In step 414, the imaging illumination subsystem 800 of the terminal 1000 projects an illumination pattern, of the same duration as the illumination pattern projected in the illuminated exposure period 321, but the imaging subsystem 900 of the terminal 1000 remains inactive and does not expose a frame of image data. This corresponds to non-exposure illumination period 324 of screen reading cycle 305A as seen in FIG. 5, which includes imaging illumination activation signal 343, which takes place after exposure activation signal 353 and before aimer activation signal 363.

Step 415 involves performing a second active aimer period of an indicia reading terminal. In step 415, the aimer subsystem 1208 of the terminal 1000 projects an aimer illumination pattern again for another active aimer period, of the same duration as the aimer illumination pattern projected in the first active aimer period 322 of screen reading cycle 305A. This corresponds to active aimer period 325 of screen reading cycle 305A, which includes aimer activation signal 363.

After step 415 and active aimer period 325 comes an interim period 326, in which none of the imaging illumination, the imaging exposure signal, or the aimer are active, until the beginning of a subsequent screen reading cycle 305B in this example, in which periods 321 through 326 and steps 411, 412, 413, 414, and 415 are repeated. In this illustrative embodiment, within and between the screen reading cycles, the active aimer periods 362, 363, etc. last an equal amount of time as each other, and also have intervals of time between them that are equal. Also, within and between the screen reading cycles, the imaging illumination activation signals 342, 343, etc. last an equal amount of time as each other, and also have intervals of time between them that are equal. These effects may contribute to reducing or eliminating any flickering effect noticeable to the unaided eye. At the same time, the screen reading cycle provides for both illuminated exposure periods and unilluminated exposure periods, but in a way such that they are fit in between the imaging illumination periods and active aiming periods without disturbing the regular periodicity or uniformity of the imaging illumination periods or active aiming periods. Both the regular periodicity, with regular intervals of time between the illumination, both imaging illumination and aimer illumination, as well as uniformity of the imaging illumination periods with each other and of the active aiming periods with each other, contribute to reducing or eliminating apparent flickering effects.

Each frame of image data may be downloaded from the image sensor array 1033, to a buffer or directly to a processor, at the end of the exposure period in which it is acquired, including the illuminated exposure period in step 411 and the unilluminated exposure period in step 415. Both of these steps may therefore be followed by step 421, of performing an attempted decode on at least one of the frames of image data. One or more frames of image data may be analyzed at the same time, by one or more processors, in the attempt to decode an indicia from at least one of the frames of image data.

Decision node 431 in FIG. 4 depicts determining whether an indicia has been decoded from at least one of the frames of data. A successful decode of an indicia may bring the screen reading cycle of steps 411 through 415 to a conclusion, while not having yet successfully decoded an indicia from the frames of image data may lead to repeating the screen reading cycle of steps 411 through 415. The step of attempting to decode an indicia may continue running in parallel with ongoing operation of the screen reading cycles and acquiring new illuminated exposures and unilluminated exposures; and attempting to decode an indicia may continue operating on multiple frames of image data at the same time, using both one or more illuminated exposure frames and one or more unilluminated exposure frames, until an indicia is decoded in any one of the frames.

While the intervals of time between the active aimer periods are approximately equal, and the intervals of time between the active illumination periods are approximately equal, it is understood that they generally aren't exactly equal, nor do they need to be. Rather, they are equal within nominal tolerances, which may include many types of uncertainty and margin of error but which do not make the intervals so different from equal that they generate a noticeable interference with the reduction or elimination of flicker effects. Nominal tolerances may include ranges of variation understood and accepted in the industry to exist in components and how they affect internal signal timing in a terminal, within acceptable quality assurance limits, and without a terminal being considered defective according to standard practices and expectations in the industry. Departing from exactly equal within nominal tolerances may also be an artifact of design choices in programming the control signals. Similarly, nominal tolerances may also apply to the active aimer periods lasting an equal amount of time, and to the active illumination periods lasting an equal amount of time, where these are a generally equal amount of time within a normally expected range of variation or margin of error.

Keeping the intervals of time between illumination periods below a threshold interval of time for persistence of vision also contributes to reducing or eliminating apparent flickering effects. This threshold interval of time for persistence of vision may be generally approximately 40 milliseconds, and different embodiments may illustratively maintain a period of less than around 40 milliseconds for repetition of the active aimer periods, as well as for repetition of the active imaging illumination periods. As an illustrative example, the embodiment of FIGS. 4 and 5 may acquire frames of image data at a frame rate of approximately 60 frames per second, or about one exposure per approximately 17 milliseconds on average. Each screen reading cycle 305A, 305B, etc. may last approximately 34 milliseconds, with approximate values of around one millisecond for illuminated exposure period 321, five milliseconds for first active aimer period 322, eleven milliseconds for unilluminated exposure period 323, one millisecond for non-exposure illumination period 324, five milliseconds for second active aimer period 322, and eleven milliseconds for interim period 326, as illustrative examples. In this example, the intervals of time from a beginning of one of the active aimer periods to the beginning of an immediately subsequent active aimer period are about seventeen milliseconds, well under the threshold maximum interval of approximately 40 milliseconds to ensure that persistence of vision contributes to elimination of apparent flickering effects. Also, in this example, the intervals of time from a beginning of one of the active imaging illumination periods to the beginning of an immediately subsequent active imaging illumination period are also about seventeen milliseconds, again well under the threshold maximum interval of approximately 40 milliseconds for persistence of vision. Additionally, the intervals are kept under 20 milliseconds, with a substantial margin under 40 milliseconds, ensuring that the interval is well under the persistence of vision threshold, to reduce or eliminate apparent flickering effects.

Various other illustrative examples may use active illumination periods that last for less than or equal to two milliseconds, active aimer periods last for between two and eight milliseconds, and unilluminated exposure periods and interim periods that last for between eight and eighteen milliseconds, as illustrative examples in each case. Still other implementations may vary from these examples to have periods of lesser or greater amounts of time in each case.

Either one or several screen reading cycles may be performed by a terminal. A terminal may be set to perform a set number of screen reading cycles, unless it decodes an indicia before the set number is finished and stops early, or a terminal may be set to continue performing screen reading cycles on an open-ended basis until an indicia decode occurs.

Different implementations of screen reading cycles may also differ in details or ordering of the steps and periods described above. For example, in other illustrative embodiments, each screen reading cycle may begin at any of periods 322 through 326, i.e. any other period besides illuminated exposure period 321 and any corresponding step, and cycle through the same steps in the same order but beginning from one of the other periods 322 through 326. So, for example, each screen reading cycle could begin with first active aimer period 322, and cycle through periods 322 through 326 and then illuminated exposure period 321 to finish that cycle.

As another example, in yet other illustrative embodiments, the various steps and periods may be performed in an order that is time-reversed from the ordering of the illustrative embodiment of FIGS. 4 and 5. These implementations may also begin with any of the six periods 321 through 326 as presented in FIG. 5, and cycle through all six of these periods, but in a time-reversed ordering relative to the ordering depicted for periods 321 through 326 in FIG. 5 and steps 411 through 415 in FIG. 4. So, for example, one implementation of a screen reading cycle may begin with a first active aimer period analogous to period 322, then activate an illuminated exposure period analogous to period 321, then wait through an across-the-board inactive period analogous to period 326, then activate a second active aimer period analogous to period 325, then activate a non-exposure illumination period analogous to period 324, then finish with an unilluminated exposure period 323, and may then repeat subsequent cycles in this order.

As another example, in a variation of the embodiment depicted in FIGS. 4 and 5, another unilluminated exposure may be performed during the interim period after second active aimer period 363 and prior to the following screen reading cycle 305A, where this second unilluminated exposure period would be shorter than the first unilluminated exposure period 353 of the cycle, to allow time for the frame of image data to download from the image sensor array 1033 to buffer prior to the subsequent illuminated exposure period 321 of the subsequent screen reading cycle 305B.

In still other examples, instead of illuminated exposure periods and unilluminated exposure periods alternating on a one-to-one basis, there may be two or more illuminated exposure periods repeated before or after an unilluminated exposure period in the cycle, or two or more unilluminated exposure periods repeated before or after an illuminated exposure period in the cycle, or other alterations in the order between unilluminated exposure periods and illuminated exposure periods. In yet other examples, subsequent screen reading cycles may alternate flexibly between different orderings rather than repeating the same periods or steps in the same order in each cycle in a series.

These embodiments share in common that they, in these illustrative examples, provide active aimer periods and active illumination periods in ways that reduce or eliminate apparent flickering effects, while providing both illuminated and unilluminated exposure periods.

Returning to FIG. 3, the illustrative embodiment of indicia reading terminal 1000 as depicted in block diagram form in FIG. 3 illustrates various additional hardware platform features for support of operations described herein, according to a variety of illustrative embodiments. For example, processor 1060 may illustratively be or include a central processing unit (CPU) in the embodiment of indicia reading terminal 1000 of FIGS. 1 and 3. Processor 1060 may illustratively be or include a complex programmable logic device (CPLD), an application-specific integrated circuit (ASIC), a field programmable gate array (FPGA), or any type of circuit capable of processing logic operations, in accordance with various embodiments.

In an illustrative embodiment, elements of an imaging illumination subsystem 800 and an imaging subsystem 900 may be incorporated into an imaging module 299, as illustratively depicted in FIGS. 1, 2, and 3. An imaging module 299 may include various elements as depicted in FIGS. 2 and 3 as well as potentially additional elements in various embodiments. Exemplary imaging module 299 can include a printed circuit board carrying an image sensor integrated circuit 1040 having an image sensor array 1033. Exemplary imaging module 299 can include an imaging optics assembly 200 supported by a support assembly. An imaging subsystem 900 fully or partially comprised in imaging module 299 can comprise an image sensor array 1033 which can be integrated onto image sensor integrated circuit 1040 in combination with imaging optics assembly 200.

Indicia reading terminal 1000 can include an image sensor 1032 comprising a multiple pixel image sensor array 1033 having pixels arranged in rows and columns of pixels, associated column circuitry 1034 and row circuitry 1035. Associated with the image sensor 1032 can be amplifier circuitry 1036 (amplifier), and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. Image sensor integrated circuit 1040 can incorporate fewer than the noted number of components.

In one example, image sensor integrated circuit 1040 can be provided e.g., by an MT9V022 (752×480 pixel array) or an MT9V023 (752×480 pixel array) image sensor integrated circuit available from Micron Technology, Inc. In one example, image sensor integrated circuit 1040 can incorporate a Bayer pattern filter, so that certain colored pixel positions may be defined at the image sensor array, with red pixels at red pixel positions, green pixels at green pixel positions, and blue pixels at blue pixel positions. Other types of color filter arrays may be used in various embodiments. Frames that are provided utilizing such an image sensor array incorporating a Bayer pattern can include red pixel values at red pixel positions, green pixel values at green pixel positions, and blue pixel values at blue pixel positions. In an embodiment incorporating a Bayer pattern image sensor array, processor 1060 prior to subjecting a frame to further processing can interpolate pixel values at frame pixel positions intermediate of green pixel positions utilizing green pixel values for development of a monochrome frame of image data. Alternatively, processor 1060 prior to subjecting a frame for further processing can interpolate pixel values intermediate of red pixel positions utilizing red pixel values for development of a monochrome frame of image data. Processor 1060 alternatively prior to subjecting a frame for further processing can interpolate pixel values intermediate of blue pixel positions utilizing blue pixel values.

In the course of operation of terminal 1000, image signals can be read out of image sensor 1032, converted, and stored into a system memory 1085 illustratively including RAM 1080. A memory 1085 of terminal 1000 can include RAM 1080, a nonvolatile memory such as EPROM 1082 and a storage memory device 1084 such as may be provided by a flash memory or a hard drive memory, and/or various other types of memory components in various embodiments. In one embodiment, terminal 1000 can include processor 1060 which can be adapted to read out image data stored in memory 1080 and subject such image data to various image processing algorithms. Terminal 1000 can include a direct memory access unit (DMA) 1070 for routing image information read out from image sensor 1032 that has been subject to conversion to RAM 1080. In another embodiment, terminal 1000 can employ a system bus providing for bus arbitration mechanism (e.g., a PCI bus) thus eliminating the need for a central DMA controller. A wide variety of other embodiments of system bus architecture and/or direct memory access components may provide for efficient data transfer between the image sensor 1032 and RAM 1080 within the scope of the invention.

Referring to further aspects of terminal 1000, imaging optics assembly 200 can be adapted for focusing an image of a decodable indicia 15 located within a field of view 1240 on a substrate, T, onto image sensor array 1033. A size in paper space of a field of view 1240 of terminal 1000 can be varied in a number of alternative ways. A size in target space of a field of view 1240 can be varied e.g. by changing a terminal to target distances, changing an imaging lens setting, changing a number of pixels of image sensor array 1033 that are subject to read out. Imaging light rays can be transmitted about imaging axis 25. Imaging optics assembly 200 can be adapted to be capable of multiple focal lengths and multiple planes of optical focus (best focus distances).

Terminal 1000 can include an imaging illumination subsystem 800 for illumination of a target, T, such as screen 242 of digital device 240 as in FIG. 1, and for projection of an illumination pattern 1260. Illumination pattern 1260, in the embodiment shown, can be projected to be proximate to but larger than an area defined by field of view 1240, but can also be projected in an area smaller than an area defined by a field of view 1240.

In various illustrative embodiments, imaging illumination subsystem 800 may include an imaging illumination light source assembly 700 that may include one or more light sources, according to various illustrative embodiments. Imaging illumination light source assembly 700 may further include one or more light source banks, each comprising one or more light sources, for example. Such light sources can illustratively include light emitting diodes (LEDs), in an illustrative embodiment. LEDs with any of a wide variety of wavelengths and filters or combination of wavelengths or filters may be used in various embodiments. Other types of light sources may also be used in other embodiments. The light sources may illustratively be mounted to a printed circuit board. This may be the same printed circuit board on which an image sensor integrated circuit 1040 having an image sensor array 1033 may illustratively be mounted.

In various illustrative embodiments, imaging illumination subsystem 800 may include an imaging illumination optical assembly 701, as is shown in the embodiment of FIGS. 2 and 3. Imaging illumination optical assembly 701, or other parts of imaging illumination subsystem 800, may include any of a variety of optical elements such as one or more lenses, one or more diffusers, one or more mirrors, and/or one or more prisms, as illustrative examples. Imaging illumination optical assembly 701 may thereby focus, diffuse, shape, or otherwise project illumination toward a target area. Imaging illumination subsystem 800 may thereby project an illumination pattern toward or onto a target area. An illumination pattern thus projected may include any type or pattern of illumination in different embodiments.

In use, terminal 1000 can be oriented by an operator with respect to a target, T, (e.g., screen 242 of digital device 240, a piece of paper, a package, or any other type of substrate) bearing decodable indicia 15 in such manner that illumination pattern 1260 is projected on a decodable indicia 15. In the illustrative example of FIGS. 1 and 2, decodable indicia 15 is provided by a one dimensional (1D) bar code symbol. Decodable indicia 15 may be provided by a 1D bar code symbol, a 2D bar code symbol, optical character recognition (OCR) characters, or other types of decodable indicias in various illustrative embodiments.

Referring to further aspects of terminal 1000, imaging optics assembly 200 can be controlled with use of electrical power input unit 1202 which provides energy for changing a plane of optimum focus of imaging optics assembly 200. In one embodiment, an electrical power input unit 1202 can operate as a controlled voltage source, and in another embodiment, as a controlled current source. Illumination subsystem light source assembly 700 can be controlled with use of light source control circuit 1206. Electrical power input unit 1202 can apply signals for changing optical characteristics of imaging optics assembly 200, e.g., for changing a focal length and/or a best focus distance of (a plane of optimum focus of) imaging optics assembly 200. Light source control circuit 1206 can send signals to illumination pattern light source assembly 700, e.g., for changing a level of illumination output by illumination pattern light source assembly 700.

Various embodiments for lens assemblies for use as imaging optics assembly 200 are described further as follows. In the embodiment of FIG. 3, imaging optics assembly 200 may comprise a fluid lens 202. Fluid lens 202 in one embodiment can be an electrowetting fluid lens comprising a plurality of immiscible optical fluids. Fluid lens 202 in one embodiment can be provided by an ARCTIC 314 or ARCTIC 316 fluid lens of the type available from VARIOPTIC S.A. of Lyon, France. Fluid lens 202 can alternatively be a fluid lens of the type having a deformable surface, and can be provided in association with a mechanical actuator assembly (not shown) coupled to power input unit 1202. Various other types of lenses and/or other optical elements may also be included in imaging optics assembly 200, in various other embodiments.

Terminal 1000 can also include a number of peripheral devices such as trigger 1220 which may be used to make active a trigger signal for activating frame readout and/or certain decoding processes. Terminal 1000 can be adapted so that activation of trigger 1220 activates a trigger signal and initiates a decode attempt. Specifically, terminal 1000 can be operative so that in response to activation of a trigger signal, a succession of frames can be read out and captured by way of read out of image information from image sensor array 1033 (typically in the form of analog signals) and then storage of the image information after conversion into memory 1080 (which can buffer one or more of the succession of frames at a given time). Processor 1060 can be operative to subject one or more of the succession of frames to a decode attempt.

For attempting to decode a bar code symbol, e.g., a one dimensional bar code symbol, processor 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup, as an illustrative example.

Terminal 1000 can include various interface circuits for coupling various of the peripheral devices to system address/data bus (system bus) 1500, for communication with processor 1060 also coupled to system bus 1500. Terminal 1000 can include interface circuit 1028 for coupling image sensor timing and control circuit 1038 to system bus 1500, interface circuit 1102 for coupling electrical power input unit 1202 to system bus 1500, interface circuit 1106 for coupling illumination light source bank control circuit 1206 to system bus 1500, and interface circuit 1120 for coupling trigger 1220 to system bus 1500. Terminal 1000 can also include a display 1222 coupled to system bus 1500 and in communication with processor 1060, via interface 1122, as well as pointer mechanism 1224 in communication with processor 1060 via interface 1124 connected to system bus 1500.

Terminal 1000 can also include aimer subsystem 1208 coupled to system bus 1500 via interface 1108. Aimer subsystem 1208 may illustratively include an aimer light source 1281 and aimer optical elements 1283 and 1285. For example, aimer light source 1281 may include one or more light emitting diodes (LEDs) and/or aiming lasers, while aimer optical elements may include one or more apertures 1283, and one or more lenses 1285, which may be a spherical lens, an aspheric lens, a cylindrical lens, or an animorphic lens, for example. Aimer subsystem 1208 projects light from aimer light source 1281 through aperture 1283 and optics 1285 to provide an aiming pattern onto a target to assist in capturing an image of the target with image sensor array 1033. The aimer light source 1281 may projects light forward into a hemispherical pattern, for example. The front surface of an LED light source may contains an integrated convex lens surface designed to reduce the angular divergence of the light leaving the LED. As much of this light as possible is directed through the aimer aperture 1283 and directed to further pass through the aimer optics 1285. The aimer optics 1285 may be designed to create an image of the aimer aperture onto the indicia located in the target T. Aimer subsystem 1208 may in another implementation include a laser and a laser collimator, for example.

A succession of frames of image data that can be captured and subject to the described processing can be full frames (including pixel values corresponding to each pixel of image sensor array 1033 or a maximum number of pixels read out from array 1033 during operation of terminal 1000). A succession of frames of image data that can be captured and subject to the described processing can also be "windowed frames" comprising pixel values corresponding to less than a full frame of pixels of image sensor array 1033. A succession of frames of image data that can be captured and subject to the described processing can also comprise a combination of full frames and windowed frames.

A full frame can be captured by selectively addressing for read out pixels of image sensor 1032 having image sensor array 1033 corresponding to the full frame. A windowed frame can be captured by selectively addressing for read out pixels of image sensor 1032 having image sensor array 1033 corresponding to the windowed frame. In one embodiment, a number of pixels subject to addressing and read out determine a picture size of a frame. Accordingly, a full frame can be regarded as having a first relatively larger picture size and a windowed frame can be regarded as having a relatively smaller picture size relative to a picture size of a full frame. A picture size of a windowed frame can vary depending on the number of pixels subject to addressing and readout for capture of a windowed frame.

Terminal 1000 can capture frames of image data at a rate known as a frame rate. An illustrative frame rate may be 60 frames per second (FPS) which translates to a frame time (frame period) of 16.6 milliseconds (ms), in an illustrative embodiment. Another illustrative frame rate may be 30 frames per second (FPS) which translates to a frame time (frame period) of 33.3 ms per frame, in an illustrative embodiment. In another illustrative embodiment, a frame rate of 1,000 frames per second may be used, with a frame period of 1 millisecond. Any of a wide variety of frame periods and frame rates may be used in different embodiments. The frame periods may also differ from one frame to the next, and for example may be shorter on an illuminated exposure frame, and longer on a subsequent unilluminated exposure frame. A frame rate of terminal 1000 can be increased (and frame time decreased) by decreasing of a frame picture size.

Each frame period may illustratively include preliminary operations to an exposure, performing the exposure itself and associated simultaneous operations, and operations after the exposure. The operations after the exposure may illustratively include any or all of a process of reading data out of image sensor 1032; providing post-exposure flicker correction illumination with imaging illumination subsystem 800; converting, storing, or buffering data in system memory 1085; and processing stored or buffered frames by processor 1060, such as processing for attempting to decode a decodable indicia. In an illustrative embodiment, reading data out of image sensor 1032 and/or providing post-exposure flicker correction illumination may be performed within the post-exposure portion of a frame period, while at least part of additional steps of converting, storing, or buffering data, and processing stored or buffered data such as processing for attempting to decode a decodable indicia, may extend past the frame period of the exposure in which a frame of data was captured and after one or more subsequent frame periods have commenced.

An illustrative physical form factor of terminal 1000 in accordance with an illustrative embodiment is shown in FIG. 1. Trigger 1220, display 1222, pointer mechanism 1224, and keyboard 1226 can be disposed on a common side of a hand held housing 1014 as shown in FIG. 1. Display 1222 and pointer mechanism 1224 in combination can be regarded as a user interface of terminal 1000. Display 1222 in one embodiment can incorporate a touch panel for navigation and virtual actuator selection in which case a user interface of terminal 1000 can be provided by display 1222. A user interface of terminal 1000 can also be provided by configuring terminal 1000 to be operative to be reprogrammed by decoding of programming bar code symbols. Imaging module 299 including image sensor array 1033 and imaging optics assembly 200 can be incorporated in hand held housing 1014. A hand held housing 1014 for terminal 1000 may be devoid of a display in various illustrative embodiments. A hand held housing 1014 for terminal 1000 may be in a gun style form factor in various illustrative embodiments. Other types of housings may be used in other embodiments such as a fixed mount housing, for example. Other form factors and sets of features and components may be used in other embodiments.

Referring to terminal 1000, terminal 1000 can be operative to change settings or states of imaging illumination subsystem 800 and imaging subsystem 900 between at least a first exposure and resulting frame of image data, and a second exposure and resulting frame of image data. The second frame can be a successive frame in relation to the first frame or a non-successive subsequent frame in relation to the first frame, and either or both frames may be from either an illuminated exposure period or an unilluminated exposure period. The first and second frames of image data may be exposed, captured, and processed during a single trigger signal activation period (decoding sessions), or during separate trigger signal activation periods (decoding sessions), in different illustrative embodiments. As indicated, a read attempt can be commenced by activation of a trigger signal resulting from depression of a trigger and can be ceased by deactivation of a trigger signal resulting e.g., from a release of a trigger.

Referring to FIG. 1 and Table A herein below, indicia reading terminal 1000 can have a plurality of different operator selectable operating configurations. In one example, a user interface display 1222, as illustratively depicted in FIG. 1, can display various buttons 6110, 6102, and 6104, corresponding to various selectable options or configurations allowing an operator to actuate one configuration out of a plurality of configurations. Button 6110 may serve as a manual trigger allowing a user to manually select operation of a screen reading mode, for activating scanning using screen reading cycles. Buttons 6102 and 6104 may allow selection of different operating modes: one in which the screen reading mode is performed on an open loop basis, selected by button 6102, and one in which the screen reading mode is performed on a closed loop basis, selected by button 6104.

With the open loop basis selected by button 6102 selected and active, aimer, illumination and imaging settings associated with a succession of frames can vary on an open loop basis without regard to a sensed condition. With the closed loop basis selected by button 6104 selected and active, aimer, illumination and imaging settings associated with a succession of frames can vary on a closed loop basis, i.e., can change responsively to a contingent condition being sensed. A sensed condition may be, for example: sensor detection of an operating screen in an imaging target area; or expiration of a timeout; or a sensed terminal to target distance, as illustrative examples. The detection of an operating screen condition may involve a dedicated sensor, or aspects of existing features of the terminal that adapt it for sensing an operating screen in an imaging target area, as illustrative examples. The expiration of a timeout condition may illustratively involve terminal 1000 being operative so that the illumination subsystem state changes responsively to a first timeout conditionally on the condition that the terminal does not decode a decodable indicia prior to expiration of the first timeout, and a trigger signal can be deactivated responsively to a second timeout.

A small sample of illustrative devices, systems, apparatuses, or methods that are described herein is as follows:

A1. An indicia reading terminal comprising:
an illumination subsystem operative for projecting an illumination pattern;
an aimer subsystem operative for projecting an aiming pattern;
an imaging subsystem comprising an image sensor array and an imaging optics assembly operative for focusing an image onto the image sensor array;
a housing encapsulating the illumination subsystem, the aimer subsystem, and the imaging subsystem;
a memory capable of storing frames of image data representing light incident on the image sensor array; and
a processor operative for addressing said memory, wherein said processor is operative to attempt to decode a decodable indicia represented in at least one of the frames of image data;
wherein the indicia reading terminal, in response to a screen reading signal, is operative to activate a screen reading cycle, wherein:
the imaging subsystem is activated at least once at the same time that the illumination subsystem is activated for one of a plurality of active illumination periods, for a first illuminated exposure period;
the imaging subsystem is activated at least once while the illumination subsystem is not activated, for a first unilluminated exposure period, which is longer than the first illuminated exposure period; and
the aimer subsystem is activated for a plurality of active aimer periods when neither the imaging subsystem or the illumination subsystem is activated, wherein intervals of time between the active aimer periods are equal, within nominal tolerances.

A2. The terminal of A1, wherein the terminal is further operative such that the active aimer periods last an equal amount of time, within nominal tolerances.

A3. The terminal of A1, wherein the terminal is further operative such that the intervals of time from a beginning of one of the active aimer periods to the beginning of an immediately subsequent active aimer period are less than or equal to 40 milliseconds.

A4. The terminal of A1, wherein the terminal is further operative such that intervals of time between the active illumination periods are equal, within nominal tolerances.

A5. The terminal of A1, wherein the terminal is further operative such that the active illumination periods last an equal amount of time, within nominal tolerances.

A6. The terminal of A1, wherein the terminal is further operative such that intervals of time from a beginning of one of the active illumination periods to the beginning of an immediately subsequent active illumination period are less than or equal to 40 milliseconds.

A7. The terminal of A1, wherein the terminal is further operative such that the imaging subsystem captures a first illuminated frame of image data during the first illuminated exposure period, the imaging subsystem captures a first unilluminated frame of image data during the first unilluminated exposure period, and the processor attempts to decode a decodable indicia from both the illuminated frame of image data and the unilluminated frame of image data.

A8. The terminal of A1, wherein the terminal is further operative such that the first illuminated exposure period is activated prior to the first unilluminated exposure period.

A9. The terminal of A1, wherein the terminal is further operative such that the first unilluminated exposure period is activated prior to the first illuminated exposure period.

A10. The terminal of A1, wherein the terminal is further operative such that the aimer subsystem is activated for a first active aimer period that is after the first illuminated exposure period and before the first unilluminated exposure period, and the aimer subsystem is activated for a second active aimer period that is after the first unilluminated exposure period and before a second illuminated exposure period.

A11. The terminal of A10, wherein the terminal is further operative such that the illumination subsystem is activated for a first non-exposure illumination period while the imaging subsystem remains inactivated, after the first unilluminated exposure period and before the second aimer period.

A12. The terminal of A11, wherein the terminal is further operative such that the screen reading cycle comprises the first illuminated exposure period; then the first active aimer period subsequent to the first illuminated exposure period; then the first unilluminated exposure period subsequent to the first active aimer period; then the first non-exposure illumination period subsequent to the first unilluminated exposure period; then the second active aimer period subsequent to the first non-exposure illumination period; and the screen reading cycle is activated a plurality of times in sequence.

A13. The terminal of A12, wherein the terminal is further operative such that the active aimer periods are equal, within nominal tolerances; the intervals of time between the active aimer periods are equal, within nominal tolerances; the active illumination periods are equal, within nominal tolerances; and the intervals of time between the active illumination periods are equal, within nominal tolerances, from one screen reading cycle to the next as the screen reading cycle is activated a plurality of times in sequence.

A14. The terminal of A1, wherein the terminal is further operative such that the active illumination periods last for less than or equal to two milliseconds.

A15. The terminal of A1, wherein the terminal is further operative such that the active aimer periods last for between two and eight milliseconds.

A16. The terminal of A1, wherein the terminal is further operative such that the first unilluminated exposure period lasts for between eight and eighteen milliseconds.

A17. The terminal of A1, wherein the terminal is further operative to activate a sequence of three or more exposure periods in the screen reading cycle, the exposure periods comprising at least one of: at least a second unilluminated exposure period; and at least a second unilluminated exposure period.

A18. The terminal of A1, wherein the terminal is further operative to activate the screen reading cycle on an open loop basis while the screen reading signal is active.

A19. The terminal of A1, wherein the terminal is further operative to activate the screen reading cycle on a closed loop basis after the screen reading signal is activated.

A20. The terminal of A1, wherein the terminal is further operative to activate the screen reading cycle in response to detection of a screen of a digital device in a reading target area of the terminal.

A21. The terminal of A1, wherein the terminal is further operative to activate the screen reading cycle in response to detection of an indicia that encodes instructions for the terminal to enter the screen reading cycle.

A22. The terminal of A1, wherein the terminal is further operative to activate the screen reading cycle in response to a user input on the terminal to enter the screen reading cycle.

A23. A method comprising:
activating an imaging subsystem at least once at the same time that an illumination subsystem is activated for one of a plurality of active illumination periods, for a first illuminated exposure period;
activating the imaging subsystem at least once while the illumination subsystem is not activated, for a first unilluminated exposure period, which is longer than the first illuminated exposure period;
activating an aimer subsystem for a plurality of active aimer periods when neither the imaging subsystem or the illumination subsystem is activated, wherein intervals of time between the active aimer periods are equal, within nominal tolerances; and
performing an attempted decode of a decodable indicia by a processor utilizing one or more frames of image data from at least one of the first illuminated exposure period and the first unilluminated exposure period.

A24. The method of A23, wherein the active aimer periods last an equal amount of time, within nominal tolerances.

A25. The method of A23, wherein the intervals of time from a beginning of one of the active aimer periods to the beginning of an immediately subsequent active aimer period are less than or equal to 40 milliseconds.

A26. The method of A23, wherein intervals of time between the active illumination periods are equal, within nominal tolerances.

A27. The method of A23, wherein the active illumination periods last an equal amount of time, within nominal tolerances.

A28. The method of A23, wherein the intervals of time from a beginning of one of the active illumination periods to the beginning of an immediately subsequent active illumination period are less than or equal to 40 milliseconds.

A29. The method of A23, wherein the aimer subsystem is activated for a first active aimer period that is after the first illuminated exposure period and before the first unilluminated exposure period, and the aimer subsystem is activated for a second active aimer period that is after the first unilluminated exposure period and before a second illuminated exposure period.

A30. The method of A29, wherein the illumination subsystem is activated for a first non-exposure illumination period while the imaging subsystem remains inactivated, after the first unilluminated exposure period and before the second aimer period.

A31. The method of A30, wherein the first active aimer period is subsequent to the first illuminated exposure period; then the first unilluminated exposure period is subsequent to the first active aimer period; then the first non-exposure illumination period is subsequent to the first unilluminated exposure period; then the second active aimer period is subsequent to the first non-exposure illumination period; and the first illuminated exposure period, the first active aimer period, the first unilluminated exposure period, the first non-exposure illumination period, and the second active aimer period are activated a plurality of times in sequence, at an overlapping time with the performing an attempted decode of a decodable indicia by a processor utilizing one or more frames of image data from at least one of the first illuminated exposure period and the first unilluminated exposure period.

A32. The method of A31, wherein the active aimer periods are equal, within nominal tolerances; the intervals of time between the active aimer periods are equal, within nominal tolerances; the active illumination periods are equal, within nominal tolerances; and the intervals of time between the active illumination periods are equal, within nominal tolerances.

While the present invention has been described with reference to a number of specific embodiments, it will be understood that the scope of the invention is not limited to any particular embodiments or combination of embodiments or elements discussed above ore depicted in the figures. Further, while in numerous cases herein wherein devices, systems, apparatuses, or methods are described as having a certain number of elements, it will be understood that such devices, systems, apparatuses, or methods can be practiced with fewer than or greater than the illustratively indicated certain number of elements. For example, where any claimed embodiment may recite a feature or at least one feature, such as a light source, that embodiment may also comprise more than one of that feature. Also, while a number of particular embodiments have been described, it will be understood that features and aspects that have been described with reference to each particular embodiment can be used in any combination with features and aspects of any other embodiment.

What is claimed is:

1. An indicia reading terminal comprising:
an illumination subsystem operative for projecting an illumination pattern;
an aimer subsystem operative for projecting an aiming pattern;
an imaging subsystem comprising an image sensor array and an imaging optics assembly operative for focusing an image onto the image sensor array;
a housing encapsulating the illumination subsystem, the aimer subsystem, and the imaging subsystem;
a memory capable of storing frames of image data representing light incident on the image sensor array; and
a processor operative for addressing said memory, wherein said processor is operative to attempt to decode a decodable indicia represented in at least one of the frames of image data;
wherein the indicia reading terminal, in response to a screen reading signal, is operative to activate a screen reading cycle, wherein:
the imaging subsystem is activated to acquire frames of image data at least once at the same time that the illumination subsystem is activated for one of a plurality of active illumination periods, for a first illuminated exposure period;
the imaging subsystem is activated to acquire frames of image data at least once while the indicia reading terminal does not project illumination, for a first unilluminated exposure period, which is longer than the first illuminated exposure period; and
the aimer subsystem is activated for a plurality of active aimer periods when neither the imaging subsystem or the illumination subsystem is activated, wherein intervals of time between the active aimer periods are equal, within nominal tolerances.

2. The terminal of claim 1, wherein the terminal is further operative such that the active aimer periods last an equal amount of time, within nominal tolerances.

3. The terminal of claim 1, wherein the terminal is further operative such that the intervals of time from a beginning of one of the active aimer periods to the beginning of an immediately subsequent active aimer period are less than or equal to 40 milliseconds.

4. The terminal of claim 1, wherein the terminal is further operative such that intervals of time between the active illumination periods are equal, within nominal tolerances.

5. The terminal of claim 1, wherein the terminal is further operative such that the active illumination periods last an equal amount of time, within nominal tolerances.

6. The terminal of claim 1, wherein the terminal is further operative such that intervals of time from a beginning of one of the active illumination periods to the beginning of an immediately subsequent active illumination period are less than or equal to 40 milliseconds.

7. The terminal of claim 1, wherein the terminal is further operative such that the imaging subsystem captures a first illuminated frame of image data during the first illuminated exposure period, the imaging subsystem captures a first unilluminated frame of image data during the first unilluminated exposure period, and the processor attempts to decode a decodable indicia from both the illuminated frame of image data and the unilluminated frame of image data.

8. The terminal of claim 1, wherein the terminal is further operative such that the first illuminated exposure period is activated prior to the first unilluminated exposure period.

9. The terminal of claim 1, wherein the terminal is further operative such that the first unilluminated exposure period is activated prior to the first illuminated exposure period.

10. The terminal of claim 1, wherein the terminal is further operative such that the aimer subsystem is activated for a first active aimer period that is after the first illuminated exposure period and before the first unilluminated exposure period, and the aimer subsystem is activated for a second active aimer period that is after the first unilluminated exposure period and before a second illuminated exposure period.

11. The terminal of claim 10, wherein the terminal is further operative such that the illumination subsystem is activated for a first non-exposure illumination period while the imaging subsystem remains inactivated, after the first unilluminated exposure period and before the second aimer period.

12. The terminal of claim 11, wherein the terminal is further operative such that the screen reading cycle comprises the first illuminated exposure period; then the first active aimer period subsequent to the first illuminated exposure period; then the first unilluminated exposure period subsequent to the first active aimer period; then the first non-exposure illumination period subsequent to the first unilluminated exposure period; then the second active aimer period subsequent to the first non-exposure illumination period; and the screen reading cycle is activated a plurality of times in sequence.

13. The terminal of claim 12, wherein the terminal is further operative such that the active aimer periods are equal, within nominal tolerances; the intervals of time between the active aimer periods are equal, within nominal tolerances; the active illumination periods are equal, within nominal tolerances; and the intervals of time between the active illumination periods are equal, within nominal tolerances, from one screen reading cycle to the next as the screen reading cycle is activated a plurality of times in sequence.

14. The terminal of claim 1, wherein the terminal is further operative such that the active illumination periods last for less than or equal to two milliseconds.

15. The terminal of claim 1, wherein the terminal is further operative such that the active aimer periods last for between two and eight milliseconds.

16. The terminal of claim 1, wherein the terminal is further operative such that the first unilluminated exposure period lasts for between eight and eighteen milliseconds.

17. The terminal of claim 1, wherein the terminal is further operative to activate a sequence of three or more exposure periods in the screen reading cycle, the exposure periods comprising at least one of: at least a second unilluminated exposure period; and at least a second unilluminated exposure period.

18. The terminal of claim 1, wherein the terminal is further operative to activate the screen reading cycle on an open loop basis while the screen reading signal is active.

19. The terminal of claim 1, wherein the terminal is further operative to activate the screen reading cycle on a closed loop basis after the screen reading signal is activated.

20. The terminal of claim 1, wherein the terminal is further operative to activate the screen reading cycle in response to detection of a screen of a digital device in a reading target area of the terminal.

21. The terminal of claim 1, wherein the terminal is further operative to activate the screen reading cycle in response to detection of an indicia that encodes instructions for the terminal to enter the screen reading cycle.

22. The terminal of claim 1, wherein the terminal is further operative to activate the screen reading cycle in response to a user input on the terminal to enter the screen reading cycle.

23. A method comprising:
   activating an imaging subsystem to acquire frames of image data at least once at the same time that an illumination subsystem is activated for one of a plurality of active illumination periods, for a first illuminated exposure period;
   activating the imaging subsystem to acquire frames of image data at least once while the indicia reading terminal does not project illumination, for a first unilluminated exposure period, which is longer than the first illuminated exposure period;
   activating an aimer subsystem for a plurality of active aimer periods when neither the imaging subsystem or the illumination subsystem is activated, wherein intervals of time between the active aimer periods are equal, within nominal tolerances; and
   performing an attempted decode of a decodable indicia by a processor utilizing one or more frames of image data from at least one of the first illuminated exposure period and the first unilluminated exposure period.

24. The method of claim 23, wherein the active aimer periods last an equal amount of time, within nominal tolerances.

25. The method of claim 23, wherein the intervals of time from a beginning of one of the active aimer periods to the beginning of an immediately subsequent active aimer period are less than or equal to 40 milliseconds.

26. The method of claim 23, wherein intervals of time between the active illumination periods are equal, within nominal tolerances.

27. The method of claim 23, wherein the active illumination periods last an equal amount of time, within nominal tolerances.

28. The method of claim 23, wherein the intervals of time from a beginning of one of the active illumination periods to the beginning of an immediately subsequent active illumination period are less than or equal to 40 milliseconds.

29. The method of claim 23, wherein the aimer subsystem is activated for a first active aimer period that is after the first illuminated exposure period and before the first unilluminated exposure period, and the aimer subsystem is activated for a second active aimer period that is after the first unilluminated exposure period and before a second illuminated exposure period.

30. The method of claim 29, wherein the illumination subsystem is activated for a first non-exposure illumination period while the imaging subsystem remains inactivated, after the first unilluminated exposure period and before the second aimer period.

31. The method of claim 30, wherein the first active aimer period is subsequent to the first illuminated exposure period; then the first unilluminated exposure period is subsequent to the first active aimer period; then the first non-exposure illumination period is subsequent to the first unilluminated exposure period; then the second active aimer period is subsequent to the first non-exposure illumination period; and the first illuminated exposure period, the first active aimer period, the first unilluminated exposure period, the first non-exposure illumination period, and the second active aimer period are activated a plurality of times in sequence, at an overlapping time with the performing an attempted decode of a decodable indicia by a processor utilizing one or more frames of image data from at least one of the first illuminated exposure period and the first unilluminated exposure period.

32. The method of claim 31, wherein the active aimer periods are equal, within nominal tolerances; the intervals of time between the active aimer periods are equal, within nominal tolerances; the active illumination periods are equal, within nominal tolerances; and the intervals of time between the active illumination periods are equal, within nominal tolerances.

* * * * *